United States Patent
Ge et al.

(10) Patent No.: US 9,966,894 B2
(45) Date of Patent: May 8, 2018

(54) REAL-TIME VIBRATION STATE MONITORING SYSTEM AND MONITORING METHOD THEREOF

(71) Applicants: Huan Ge, Shenzhen (CN); Lijian Ye, Shenzhen (CN); Rongguan Zhou, Shenzhen (CN)

(72) Inventors: Huan Ge, Shenzhen (CN); Lijian Ye, Shenzhen (CN); Rongguan Zhou, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 17 days.

(21) Appl. No.: 15/403,532

(22) Filed: Jan. 11, 2017

(65) Prior Publication Data

US 2018/0026571 A1   Jan. 25, 2018

(30) Foreign Application Priority Data

Jul. 21, 2016 (CN) .......................... 2016 1 0581287

(51) Int. Cl.
*H02K 41/02* (2006.01)
*H02P 29/50* (2016.01)
*H02P 25/06* (2016.01)

(52) U.S. Cl.
CPC .............. *H02P 29/50* (2016.02); *H02P 25/06* (2013.01)

(58) Field of Classification Search
CPC ......... H02P 29/50; H02P 25/06; H02K 41/03; H02K 41/031

USPC ................. 318/135, 460, 114, 128, 687, 459
See application file for complete search history.

(56) References Cited

U.S. PATENT DOCUMENTS

| | | | | |
|---|---|---|---|---|
| 4,888,543 A | * | 12/1989 | Bleijenberg | G05B 19/231 318/687 |
| 5,296,790 A | * | 3/1994 | Fincher | G11B 33/08 318/460 |
| 5,384,676 A | * | 1/1995 | Yokoyama | G11B 5/588 360/77.13 |
| 2002/0149561 A1 | * | 10/2002 | Fukumoto | G01C 21/3664 345/156 |

FOREIGN PATENT DOCUMENTS

JP   2013113729 A   *   6/2013

* cited by examiner

*Primary Examiner* — Jorge L Carrasquillo
(74) *Attorney, Agent, or Firm* — Na Xu; IPro, PLLC

(57) ABSTRACT

The invention discloses a real-time vibration state monitoring system. The system includes a linear motor, a signal generating module for driving the linear motor to vibrate, a working parameters feedback module, a calculating module, an initial position recording module, and a signal control module. The system can control the amplitude of the vibrator by monitoring the vibration state of the vibrator in the linear motor and adjusting the drive signal; therefore, the effect to normal working or reliability of the linear motor due to oversized amplitude can be avoided. A monitoring method is also provided.

6 Claims, 2 Drawing Sheets

REAL-TIME VIBRATION STATE MONITORING SYSTEM AND MONITORING METHOD THEREOF

FIELD OF THE INVENTION

The present disclosure is related to a real-time vibration state monitoring system of a vibrator in a linear motor and a monitoring method thereof.

DESCRIPTION OF RELATED ART

A linear motor has the absolute advantage on the aspect of providing the mobile devices, such as the mobile phone, the tablet PC, etc. with the function of tactile feedback related to application program and application scene compared with other types of micro motor due to strong vibration sense and quick response time.

The linear motor runs on the basis of basic working principle, specifically driving the mechanical structure to vibrate by using the ampere force which is exerted to an electrified coil in a magnetic field. The linear motor is usually designed to have high Q value at the location of the motor frequency so far, and the frequency response curve thereof shall be subjected to quick attenuation at the place deviating from the motor frequency; therefore, the linear motor often works near the motor frequency. At the same time, the linear motor driven by a broadband can be formed by reducing the value Q on the basis of the linear motor of single motor frequency; while the linear motor can have two or more than two motor frequencies by using the appropriate structural design.

The nice tactile feedback experience can be ensured only when the vibration sense of the linear motor achieves certain value usually in the actual application scene. In this condition, the amplitude of the linear motor may exceed the maximum allowable of the device possibly, and the vibration noise may be generated. Further, the reliability of the linear motor working for a long time shall be affected. Therefore, it is particularly important to monitor the vibration state of the vibrator thereof when the linear motor works.

Therefore, it is necessary to provide a real-time vibration state monitoring system to perform the requirement mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain this disclosure, not intended to limit this disclosure.

Figure 1:
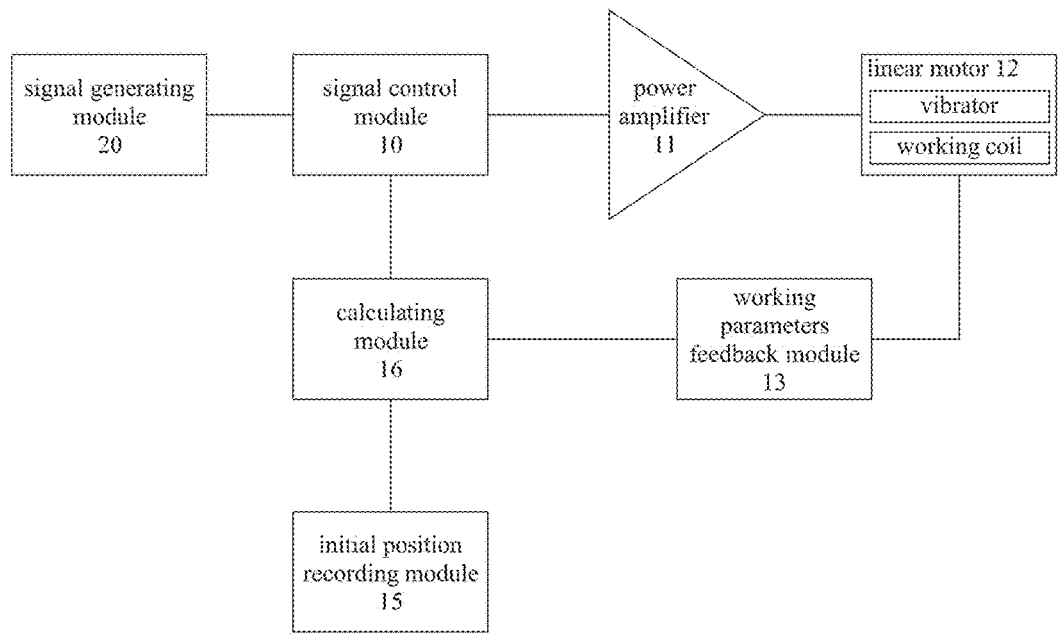
FIG. 1 is a structural diagram of a real-time vibration state monitoring system in accordance with a first exemplary embodiment of the present disclosure.

Please refer to FIG. 1, a real-time vibration state monitoring system 1 comprises a signal generating module 20, a signal control module 10, a power amplifier 11 and a linear motor 12 which are connected in order electrically.

The signal generating module 20 provides the drive signal to drive the linear motor 12 to vibrate; the signal control module 10 receives the drive signal and transmits the drive signal received to the power amplifier 11 for amplifying the drive signal; and the linear motor 12 receives the drive signal amplified by the power amplifier 11 in order to generate vibration.

The linear motor 12 comprises a vibrator generating vibration and a working coil which interacts with the vibrator to generate the induced electromotive force.

The real-time vibration state monitoring system 1 of the vibrator in the linear motor further comprises a working parameters feedback module 13 which monitors and returns the induced electromotive force generated during vibration of the linear motor 12 in real time, wherein the working parameters feedback module 13 connects with the linear motor 12 electrically. In this embodiment, the working parameters feedback module 13 monitors the current and the voltage of the drive signal on an inputting end of the linear motor, and calculates and returns the induced electromotive force in accordance with the current and the voltage.

The monitoring system 1 further comprises a calculating module 16 which is connected between the signal control module 10 and the working parameters feedback module 13 electrically. Moreover, the calculating module 16 calculates the vibrating speed, the acceleration and the amplitude of the vibrator in accordance with the induced electromotive force, the power coupling coefficient and the initial position and outputs the calculation result.

The real-time vibration state monitoring system 1 of the vibrator in the linear motor further comprises an initial position recording module 15 which connects with the calculating module 16 electrically, updates the initial position of the vibrator regularly in accordance with the calculation result of the calculation module and outputs the initial position to the calculating module 16.

The signal control module 10 adjusts the drive signal which is input to the linear motor by using corresponding control algorithm in accordance with the amplitude of the vibrator output by the calculating module 16, and controls the amplitude of the vibrator output so as to prevent affecting normal working or reliability of the linear motor due to oversized amplitude can be avoided.

In this embodiment, the induced electromotive force can be calculated by using the formula: $u_b=B1v$, wherein the power coupling coefficient B1 is the known parameter of the linear motor; v is the vibrating speed of the vibrator; therefore, the calculation formula of the vibrating speed v can be represented: $v=(u-R_e i)/B1$, wherein u is the voltage monitored of the working coil; i is the current monitored of the working coil; and Re is the direct-current resistance of the working coil.

In order to measure the direct-current resistance Re of the working coil, the signal control module 10 inputs a low-frequency detecting signal, for example, the sine detecting signal with frequency of 20 Hz and amplitude of 40 mV to the linear motor 12. The AC resistance of the linear motor can be acquired at the frequency point of the low-frequency detecting signal by combining with the current and the voltage returned when the low-frequency detecting signal is added; and approximate DC resistance of the working coil can be acquired when the linear motor works in real time because the impedance of the linear motor is relatively flat in the area approaching the direct current.

In this embodiment, the relationship between the acceleration a and the vibration speed v of the vibrator can be represented:

$$a = \frac{dv}{dt};$$

and the relationship between the vibrating speed v and the amplitude x of the vibrator can be represented: x=∫vdt. An initial position determining module 15 can be arranged in the monitoring system in order to record and update the initial position of the vibrator because the calculation of the amplitude x of the vibrator is related to the initial position of the vibrator. The balanced position of the linear motor when not working is positioned at the zero position. Moreover, the speed, the acceleration and the amplitude of the vibrator can be calculated and the vibrator can be monitored in real time by using the above-mentioned formula.

Figure 2:
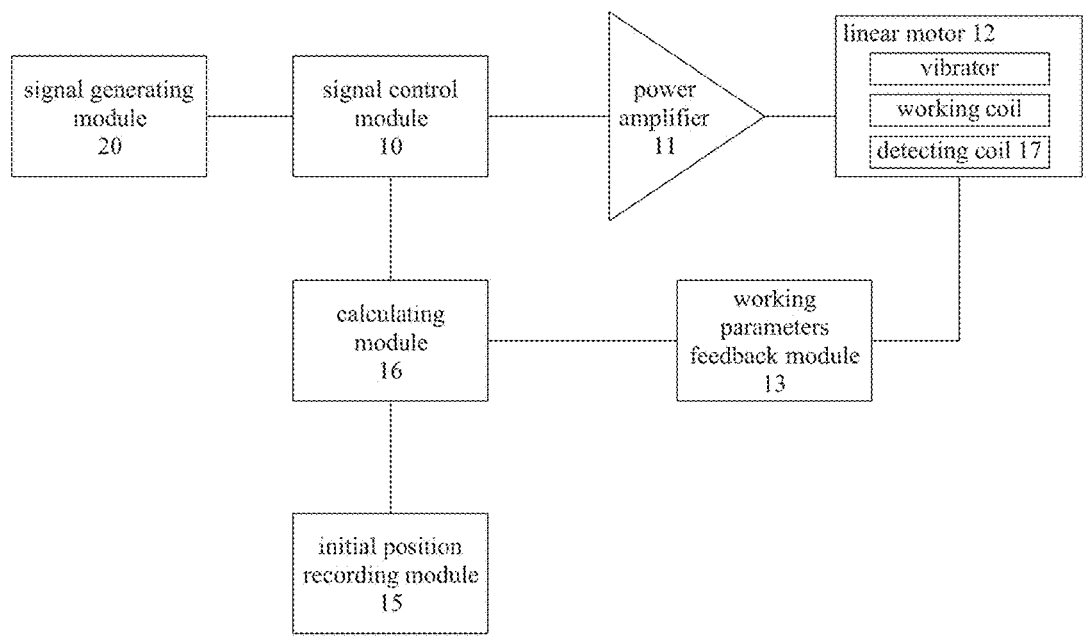
FIG. 2 is a structural diagram of a real-time vibration state monitoring system in accordance with a second exemplary embodiment of the present disclosure.

FIG. 2 shows a real-time vibration state monitoring system in accordance with a second exemplary embodiment. In this embodiment, a detecting coil 17 which is relatively static to the working coil is arranged in the linear motor 12. When the linear motor works normally, the induced electromotive force can be acquired by measuring the voltages on two ends of the detecting coil directly because the relative motion is available between the detecting coil and the linear motor and corresponding induced electromotive force is generated by the detecting coil. In this embodiment, the vibrating speed v of the vibrator can be calculated in accordance with the formula: $u_b$=B1v by monitoring the real-time voltage of the detecting coil and returning the voltage to the calculating module only in presence of the working parameters feedback module 13. Moreover, the acceleration a and the amplitude x of the vibrator can be calculated respectively by using the formula $$a = \frac{dv}{dt}$$

and formula x=∫vdt.

Figure 3:
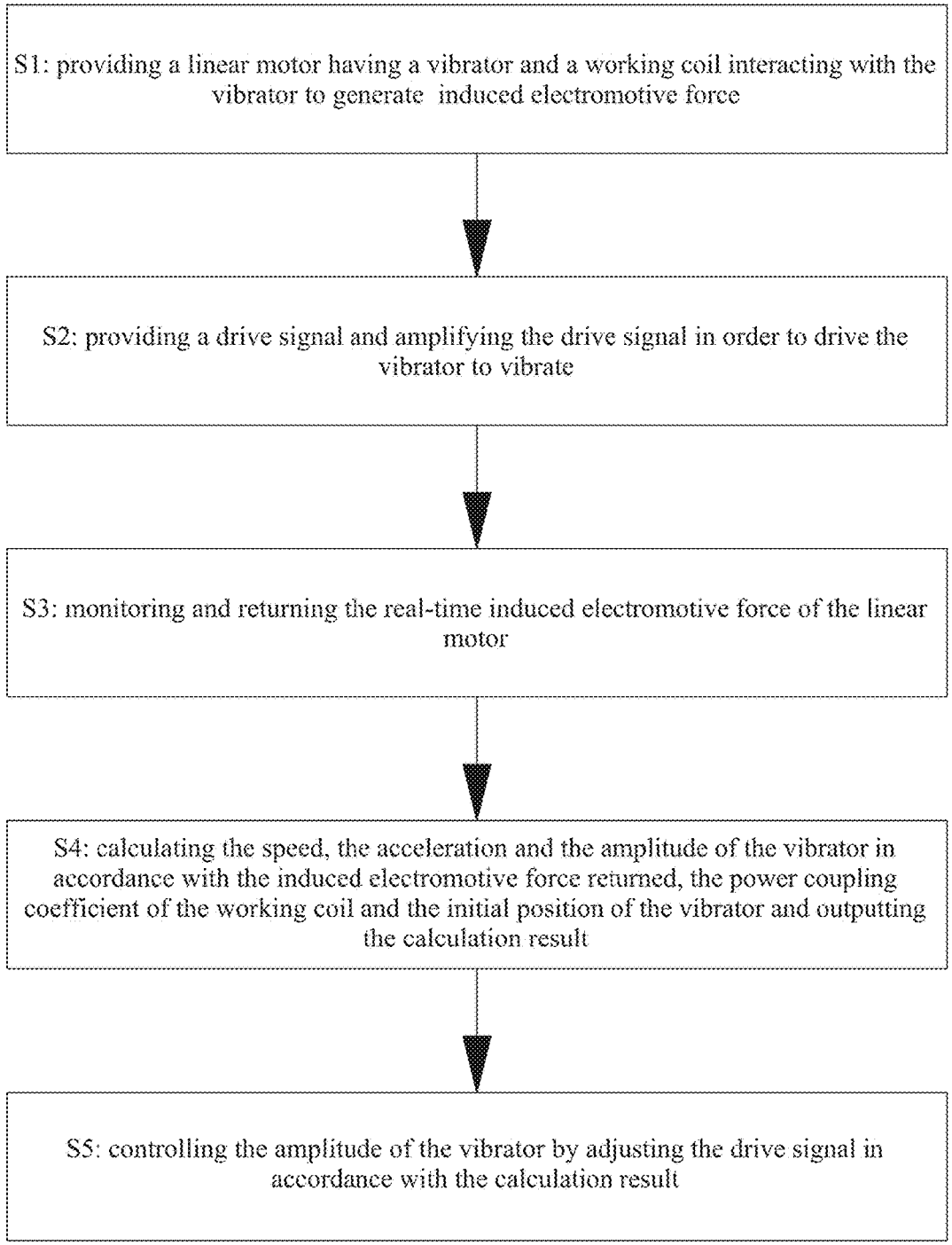
FIG. 3 is a flow chart of a monitoring method of the real-time vibration state monitoring system of the present disclosure.

Referring to FIG. 3, the present disclosure also provides a monitoring method, comprising the following steps:

S1, providing a linear motor having a vibrator and a working coil interacting with the vibrator to generate the induced electromotive force;

S2, providing a drive signal and amplifying the drive signal in order to drive the vibrator to vibrate;

S3, monitoring and returning a real-time induced electromotive force of the linear motor;

S4, calculating the speed, the acceleration and the amplitude of the vibrator in accordance with the induced electromotive force, the power coupling coefficient and the initial position of the vibrator, and outputting the calculation result;

And S5, controlling the amplitude of the vibrator by adjusting the drive signal in accordance with the calculation result.

The monitoring method further comprises the steps of:

In the step S2, providing a low-frequency detecting signal;

In the step S3, monitoring the voltage and the current of the working coil, and calculating and returning the induced electromotive force in accordance with the voltage and the current.

The monitoring method further comprises the steps of:

In the step S1, installing a detecting coil in the linear motor, wherein the detecting coil is relatively static to the working coil;

In the step S3, acquiring the induced electromotive force by monitoring the voltages on two ends of the detecting coil and returning the induced electromotive force.

Compared with relevant technology, the real-time vibration state monitoring system 1 of the vibrator in the linear motor and the monitoring method thereof in the invention can control the amplitude of the vibrator by monitoring the vibration state of the vibrator in the linear motor 12 and adjusting the drive signal; therefore, the effect to normal working or reliability of the linear motor due to oversized amplitude can be avoided.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A real-time vibration state monitoring system, comprising:
    a linear motor including a vibrator which generates vibration and a working coil which interacts with the vibrator to generate induced electromotive force;
    a signal generating module for outputting a drive signal to drive the linear motor to vibrate;
    a working parameters feedback module connecting with the linear motor electrically, for monitoring and returning the real-time induced electromotive force of the linear motor;
    a calculating module connecting with the working parameters feedback module electrically for calculating and outputting the speed, the acceleration and the amplitude of the vibrator in accordance with the induced electromotive force, the power coupling coefficient of the working coil and the initial position of the vibrator;
    an initial position recording module connecting with the calculating module electrically for recording the initial position of the vibrator, updating the initial position of the vibrator regularly in accordance with the calculation result and outputting the initial position to the calculating module;
    a signal control module connecting with the linear motor, the calculating module and the signal generating module electrically and respectively for controlling the amplitude of the linear motor by adjusting the drive signal in accordance with the calculation result;
    a power amplifier which is connected between the signal control module and the linear motor serially for amplifying the drive signal;
    wherein the linear motor further comprises a detecting coil which is arranged relatively static to the working coil; and the working parameters feedback module monitors the voltages on two ends of the detecting coil, calculates the induced electromotive force and returns it to the calculating module.

2. The real-time vibration state monitoring system as described in claim 1, wherein the signal control module also inputs a low-frequency detecting signal to the linear motor.

3. The real-time vibration state monitoring system as described in claim 2, wherein the working parameters feedback module monitors current and voltage of the working coil, calculates the induced electromotive force and returns it to the calculating module.

4. A real-time vibration state monitoring method comprising the following steps of:
S1, providing a linear motor having a vibrator and a working coil interacting with the vibrator to generate the induced electromotive force;
S2, providing a drive signal in order to drive the vibrator to vibrate;
S3, monitoring and returning the real-time induced electromotive force of the linear motor;
S4, calculating the speed, the acceleration and the amplitude of the vibrator in accordance with the induced electromotive force returned, the power coupling coefficient of the working coil and the initial position of the vibrator and outputting the calculation result;
S5, controlling the amplitude of the vibrator by adjusting the drive signal in accordance with the calculation result;
wherein in the step S2, the power amplifier is used for amplifying the drive signal;
wherein in the step S1 the detecting coil which is relatively static to the working coil is installed in the linear motor;
wherein in the step S3 the voltages on two ends of the detecting coil are monitored, and induced electromotive force is calculated, and also the induced electromotive force is returned.

5. The real-time vibration state monitoring method as described in claim 4, wherein in the step S2, a low-frequency detecting signal is provided.

6. The real-time vibration state monitoring method as described in claim 5, wherein step S3 further comprises steps of monitoring the current and the voltage of the working coil and calculating and returning the induced electromotive force.

* * * * *